Patented July 2, 1929.

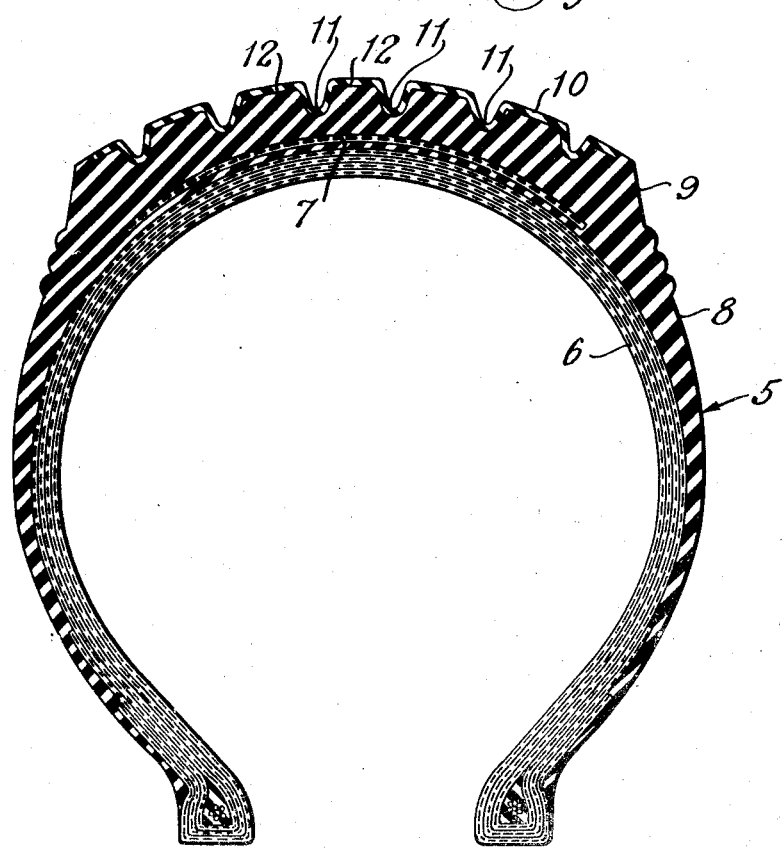

1,719,628

UNITED STATES PATENT OFFICE.

CHERI M. SLOMAN, OF DETROIT, MICHIGAN, ASSIGNOR TO MORGAN AND WRIGHT, OF DETROIT, MICHIGAN, A CORPORATION OF MICHIGAN.

TIRE CASING.

Application filed March 23, 1928. Serial No. 264,018.

This invention relates to improvements in pneumatic tire construction, and has for its principal objects to provide a tire capable of withstanding a greater degree of flexing without injury to the tread from cracking, and to permit the use of tread stocks having longer wearing qualities which would ordinarily crack under the usual conditions.

It has been found in practice that tire treads usually crack at the base of the grooves or depressions between the various anti-skid elements due to the more free flexing of the tread at these points. A small crack usually starts at the outer surface and gradually continues toward the carcass fabric, eventually causing an opening directly to this fabric and thus weakening the tire as well as being detrimental to the general appearance of the same.

The present invention contemplates the application of a thin sheet or lamination of rubber to the outer surface of the tread, such sheet being of softer and more resilient composition than the regular tread stock. While this lamination is necessary only at the bottoms of the grooves or depressions, it is preferable to place the same over the non-skid area for convenience of application and it may be extended to cover the entire tread or outside surface of the tire. It has been found that such lamination effectually prevents cracking and very materially increases the life of the tire. After the anti-skid projections are worn down and the lamination is entirely gone, the purpose of the application of the sheet rubber ceases to exist as the tire is now of substantially uniform cross-sectional area and the flexing is evenly distributed.

One embodiment of the invention is shown in the drawing in which:

Fig. 1 is a transverse section of a laminated tread stock embodying the principles of the invention.

Fig. 2 is a transverse section of a completed tire in which the tread of Fig. 1 has been incorporated.

Referring to the drawing, the tire 5 comprises a carcass assembly 6, a breaker strip 7, and a tread 8. The tread 8 is laminated and comprises a main tread or under layer 9 and a relatively thin surface or anti-cracking layer 10. The layer 9 is composed of any suitable tread stock possessing the necessary qualities of toughness and resistance to wear. Such a stock is generally relatively hard, inelastic and liable to crack when subjected to repeated flexing. The layer 10 is formed of a relatively soft stock possessing a high degree of elasticity or resiliency. The thickness of this layer 10 may be varied in tires of different sizes and types but the proportions are substantially as illustrated. While it is immaterial for the purposes of this invention when the layer 10 is applied to the tread proper, it is advisable to build up the laminated tread prior to the assembly of tread with the carcass. The assembled tire is then completed in the usual manner. The important portions of the tread to cover with the layer 10 are the bottoms as 11 of the grooves or depressions between the anti-skid elements 12 as the reduced cross sectional area of the tire at these points is subjected to continual flexing and cracks generally occur there. The flexible and elastic layer or skin prevents the crack from starting.

A satisfactory formula for the soft rubber layer 10 is as follows:

| | |
|---|---|
| 100 | parts plantation rubber |
| 20 | parts carbon black |
| 5 | parts zinc oxide |
| 3 | parts pine tar |
| .625 | part hexamethylenetetramine |
| 3.5 | parts sulphur |

A typical tread stock formula for the layer 9 is as follows:

| | |
|---|---|
| 100 | parts rubber |
| 3½ | parts sulphur |
| 5 | parts pine tar |
| 45 | parts carbon black |
| 20 | parts zinc oxide |
| 1 | part hexamethylenetetramine |

It will be understood that these formulas are given merely for the purpose of illustration, and such formulas are capable of wide variation both as to ingredients and proportions as will be evident to anyone skilled in the art. Any suitable tread composition may be used for the body of the tread, and the outer layer may be of any suitable stock which provides a relatively soft and more elastic rubber.

Having thus described my invention what

I claim and desire to protect by Letters Patent is:

In a pneumatic tire, a laminated tread comprising a body of relatively hard and wear resisting rubber composition having grooves in the wearing face thereof to form anti-skid projections thereon, and an anti-cracking layer of relatively soft and elastic rubber composition applied to and covering the bottoms of certain of said grooves.

Signed at Detroit, county of Wayne, State of Michigan, this 17th day of March, 1928.

CHERI M. SLOMAN.